Sept. 28, 1943.　　　　F. W. MILLS　　　　2,330,301
RESILIENT WHEEL
Filed Jan. 20, 1943　　　　2 Sheets-Sheet 1

Inventor
Fred W. Mills,
By Christian L. Nielsen
Attorney

Sept. 28, 1943.  F. W. MILLS  2,330,301
RESILIENT WHEEL
Filed Jan. 20, 1943  2 Sheets-Sheet 2

Inventor
Fred W. Mills,
By Christian L. Nielsen
Attorney

Patented Sept. 28, 1943

2,330,301

UNITED STATES PATENT OFFICE 2,330,301

RESILIENT WHEEL

Fred W. Mills, Mena, Ark.

Application January 20, 1943, Serial No. 473,007

4 Claims. (Cl. 152—38)

This invention relates to a combined vehicle wheel and tire of a resilient type and it consists in the constructions, arrangements and combinations herein described and claimed.

It is an object of the invention to provide a vehicle wheel in which an inner hub member is resiliently supported within a rim, thereby permitting the use of a solid tire for traction, rather than employing a pneumatic tube and tire.

More particularly, it is an object of the invention to provide a new and novel construction of springs and mounting thereof between a hub and rim, affording a high degree of resilience, yet of such nature that a positive interconnection between the rim and hub is effected, so that strain on the parts, under operation, is reduced to a minimum.

Specifically, it is an object of the invention to provide a resilient wheel in which a plurality of flat leaf springs are rockably mounted upon a hub member, circumferentially spaced therearound, the spring ends being pivotally connected to roller carriages oscillatably supported in trackways fixed within a rim member; as well as to provide automatically operable means for preventing complete collapse of the hub within the rim, in the event of spring breakage.

Additional objects, advantages and features of invention will be apparent from the following description, considered in conjunction with the accompanying drawings, wherein, Figure 1 is a side elevation, partly in section, and with one side closure plate removed, illustrating the construction of the wheel.

Figures 1, 3, 4, 7:
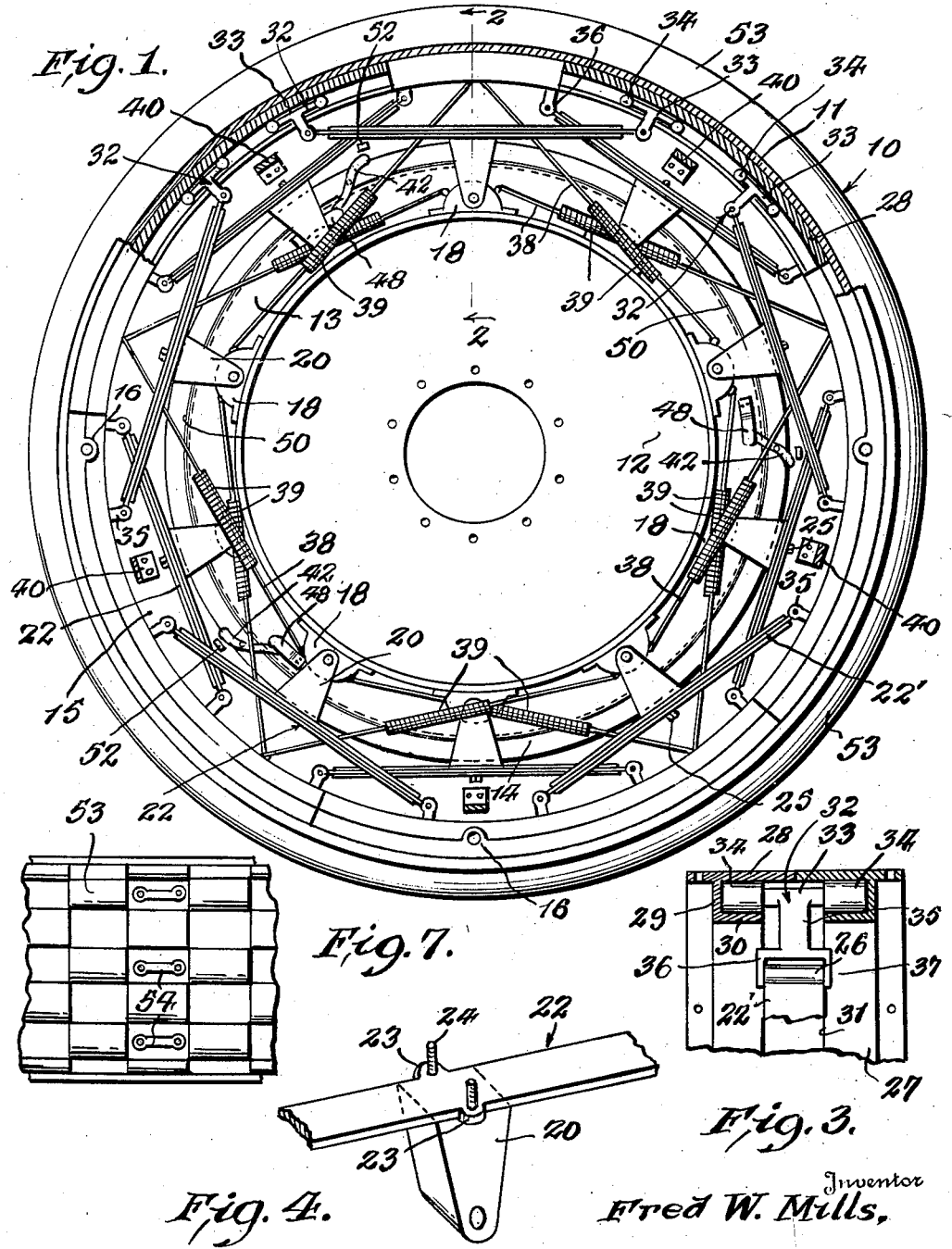
Figure 3 is an enlarged fragmentary cross section of roller carriage track-way.
Figure 4 is a perspective view illustrating the manner of mounting a spring upon an anchor block.
Figure 7 is a fragmentary top plan view of a tire which may be mounted upon the rim of the wheel.
Figure 2:
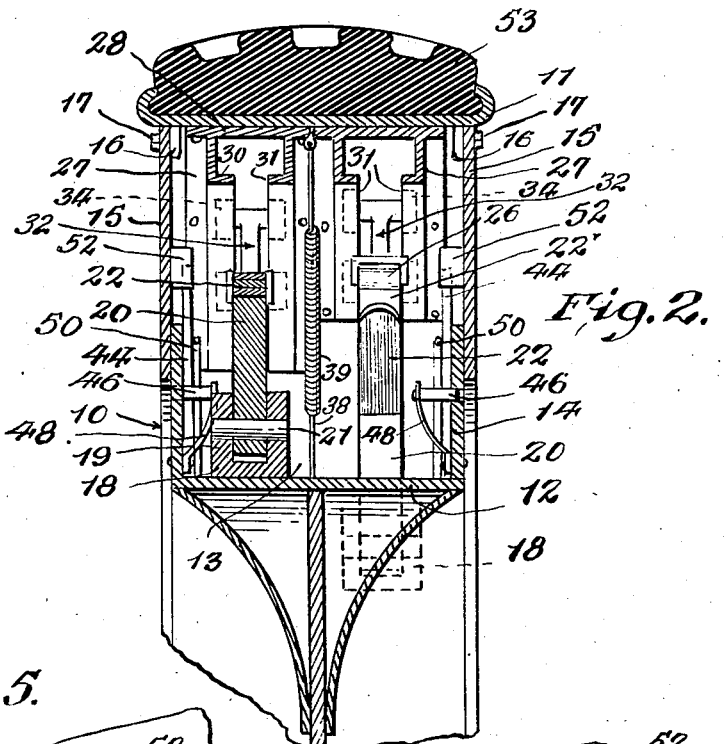
Figure 2 is a cross section on the line 2—2 of Figure 1.

Attention is first invited to Figures 1 and 2 of the drawings, wherein there is shown a wheel generally indicated by the reference character 10 which consists of a rim 11 and hub 12 resiliently supported within the rim, as will be described.

The hub 12 is provided with a peripheral circumscribing channel 13, defined by side walls 14, the channel being of a width slightly less than the width of the rim, so that the channel may be enclosed by respective side closure plates 15 which are secured to the sides of the rim. In the present instance, the closure plates 15 are secured to lugs 16 on the rim, by means of bolts 17, which construction permits ready removal of the plates so that access to the interior of the wheel may be possible, for the purpose of repair or otherwise.

Within the channel 13 and spaced circumferentially therearound, lugs 18 are mounted, comprising parallel spaced ears 19 between which a spring anchor block 20 is pivotally mounted by means of a pintle 21. As may be seen in Figure 2, the lugs 18 are arranged upon both sides of the vertical center of the channel, in alternate fashion, which is essential to the mounting of spring suspension means now to be described.

The construction of suspension springs 22 are identical and a description of one will be sufficient for an understanding of the assembly and operation. A spring 22, in the present instance, consists of multiple spring leaves, each of which is provided with apertured ears 23 medially of their lengths. The ears are aligned and disposed upon respective threaded pins 24 on the block 20, where the leaves may be fixed by means of a nut 25. The ends of the intermediate leaves 22' are provided with an eye 26 for mounting to respective roller carriages, as will be described.

Upon the inner periphery of the rim 11 adjacent the sides thereof, there are suitably secured, race or track ways 27. The race ways are shown as annular segments spaced apart about the periphery of the rim, although, if desired, the race ways may be a continuous element. The race ways on one side of the rim are spaced alternately with respect to those on the other side and are properly positioned with respect to the lugs 18. As may be seen in Figures 2 and 3, the race ways consist of a mounting plate 28, from which respective side walls 29 are extended, the latter terminating in a wall 30 spaced from but parallel to the base plate 28. The walls 30 stop short of the medial center of the base plate, forming an opening 31. A carriage 32 is mounted in mutually adjacent race ways, the carriages comprising an elongated body portion 33, upon the ends of which there are mounted rollers 34 of a diameter to snugly fit between the base plate 28 and the walls 30. A hanger arm 35 is integrally formed with the body 33, and is of a width and length to project outwardly through the opening 31 of the race way, the arm terminating in a clevis 36 adapted to receive a spring eye 26 therewithin. A pin 37 extended through the clevis and eye pivotally connects the spring to the roller carriage.

With the suspension springs 22 interconnected between the hub and rim, it will be apparent that under traction, the springs will be flexed, yet an abrupt flexing, such as might be the case where a wheel may strike an uneven surface in a road, is avoided, since the roller carriages will partake of a circumferential movement along their respective trackways. In order to prevent possible sagging between the hub and rim and to equalize any strains upon the springs 22 and roller carriages 32, pull cables 38 are connected between the inner periphery of the rim and the outer periphery of the channel of the hub, the connection with the rim, preferably being located at a position medially of the length of the springs 22. The cables 38 each include a shock absorbing spring 39 intermediate of their lengths.

If found necessary, a tie rod or plate 40 may be connected between the side closure plates 15, affording a bracing effect thereto, and since the plates are located between carriages within the raceways, they will limit extreme flexing movements of the springs by contact therewith.

Figures 5, 6:
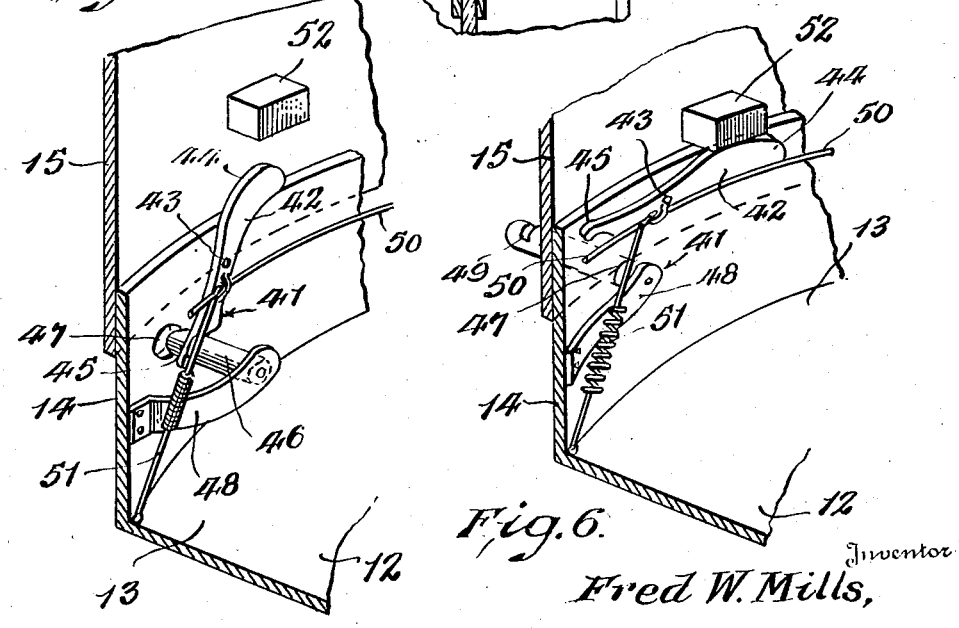
Figure 5 is a fragmentary perspective illustrating the safety feature of the wheel, in its inoperative position.
Figure 6 is a similar view showing the relation of the parts, when in operative position.

In spring constructions, there is the possibility of breakage, especially after long use, in which event the wheel would become inoperative, if not useless. In order to overcome such difficulty, I have provided a safety means generally indicated by the reference character 41, and for an understanding of the construction and operation thereof, attention is particularly invited to Figures 5 and 6 of the drawings. Upon the walls 14 of the channel of the hub, a lever 42 is pivotally mounted as at 43, the lever having a rear contact end 44 and a front end 45 constructed as a catch for maintaining a spring-pressed lug 46 in an inoperative position, as will be described. The walls 14 are provided with suitably spaced openings 47 located slightly below the lower edges of the closure plates 15, and a lug 46 is aligned with each aperture as shown in Figure 5. In the present instance, the lug 46 is shown as secured to the free end of a leaf spring 48 mounted upon the interior of the wall 14. The spring 48 functions to project the lug through the aperture when released by the catch, so as to be positioned below the edge of the closure plates 15. Any suitable interconnecting means may be provided between the catch and the lug and as here shown, the lug 46 has a kerf 49 formed therein inwardly of its outer end (see Figure 6) into which the end 45 may be disposed, when the lug is in retracted inoperative position. A plurality of safety means will be employed, spaced circumferentially of the channel, and the levers 42 will be connected by a hoop 50 so that all of the levers will be released simultaneously for projection of the lugs 46. The levers 42 are held in engagement with the lugs 46 by means of spring tensioned cables 51. A contact lug 52 is fixed upon the closure plates 15, immediately above the ends 44 of the levers 42.

In operation, in the event of spring breakage, the rim with its associated closure plates 15 will tend to move inwardly in the direction of the hub of the wheel, which will bring the contact blocks 52 into engagement with the ends 44 of the levers 42, forcing the rear ends of the levers downwardly, thereby effecting release of the lugs 46 which are then projected through the apertures 47 below the lower edge of the plates 15, preventing further collapse of the wheel. It is of course, not intended that the wheel should be operated in such condition over a long period of time, but ample rigidity between the hub and rim is provided so that the vehicle may be safely driven to a shop for repair or replacement of the broken spring or springs, as the case may be.

Any suitable solid tire 53 may be mounted upon the rim 11, but it is contemplated to construct the tire from reclaimed rubber or the like. As shown in Figure 7, the tire may be made in sections laid upon the rim in abutting relation and secured by means of links 54. Thus, any section of the tire may be quickly replaced with a new section.

While I have specifically shown and described my wheel, this is by way of illustration only and I consider as my own, all such modifications in construction as fairly fall within the scope of the appended claims.

I claim:

1. In a resilient wheel, a rim having inwardly extended closure plates on the sides thereof, a hub positioned axially within the rim, said hub having outwardly disposed side walls in slidable, abutting engagement with respective closure plates, said side walls defining a circumscribing channel, lugs fixed within the channel of the hub and spaced equally therearound, a spring mounting block pivotally mounted upon each lug, a leaf spring fixed to each block medially of its length and presenting the free ends in the direction of the rim, race-ways mounted upon the interior of the rim and aligned with the free ends of the springs, roller carriages mounted within the race-ways, each roller carriage having means for connection with respective spring ends and spring tensioned cable being connected between the rim and the hub, the connection of the cables to the rim being on a line medially of the length of the springs.

2. The structure of claim 1 in which the race-ways are positioned adjacent respective edges of the rim and in which the springs are mounted upon each side of the hub, the springs upon one side being arranged in alternate relation to the springs on the other side.

3. A safety means for resilient wheels in which the rim tends to move excessively in the direction of the hub, a series of levers pivotally mounted upon the hub, the levers being positioned in the path of a portion of the rim to be released thereby, said hub having a plurality of openings below the normal position of the rim, a spring pressed lug carried by the hub aligned with each opening, the levers being releasably connected with respective lugs, and means connecting all of said levers for simultaneous release of the lugs upon engagement of said portion of the rim and any of the levers.

4. A resilient wheel comprising a rim, a hub positioned axially within the rim, a plurality of leaf springs rockably supported upon the hub, race-ways mounted upon the inner periphery of the rim, the free ends of said leaf springs having a hanger disposed within the raceways for limited orbital movement therearound under flexure of the springs, and spring tensioned cables being connected between the rim and the hub, the connection of the cable to the rim being on a line medially of the length of the springs.

FRED W. MILLS.